July 14, 1953
L. KNIEL
2,645,104
FRACTIONAL DISTILLATION
Filed Feb. 17, 1951
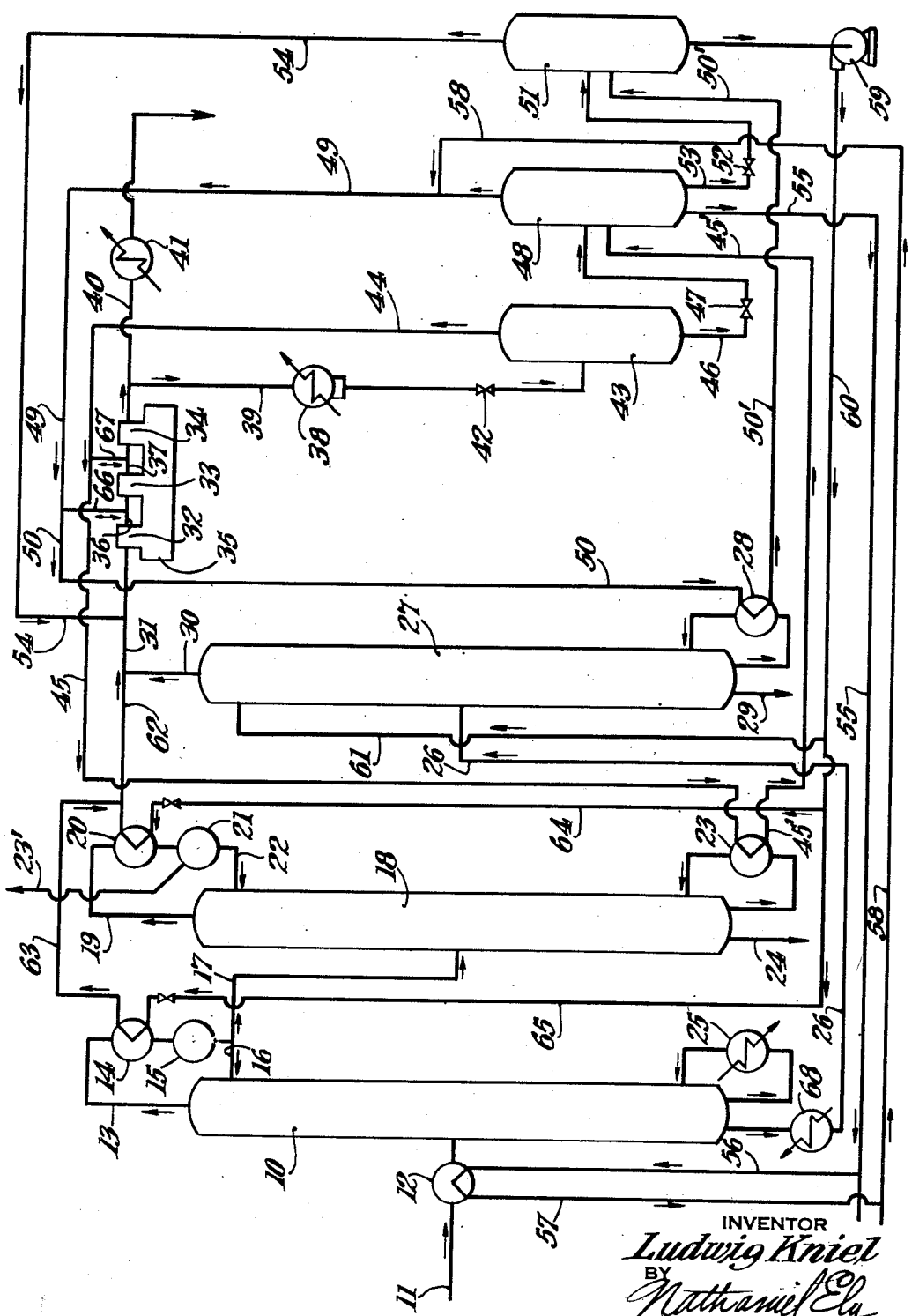
INVENTOR
*Ludwig Kniel*
BY
*Nathaniel Ely*
ATTORNEY Patented July 14, 1953

2,645,104

UNITED STATES PATENT OFFICE 2,645,104

FRACTIONAL DISTILLATION

Ludwig Kniel, Scarsdale, N. Y., assignor to The Lummus Company, New York, N. Y., a corporation of Delaware Application February 17, 1951, Serial No. 211,545

8 Claims. (Cl. 62—175.5)

1

This invention relates to the recovery of ethylene and propylene from gaseous mixtures thereof and is a continuation-in-part of my copending application Serial No. 717,264 filed December 19, 1946, now Patent No. 2,573,341.

As pointed out in that specification, it is well known that the hydrocarbon gas field, and particularly refinerly off-gas offers a very large potential supply of olefinic hydrocarbons such as ethylene and propylene which do not otherwise occur naturally, and that these gases are of tremendous importance in the synthetic chemical field. They are useful not only for the manufacture of synthetic alcohols and rubber but also for certain types of plastics and many other purposes. However, ethylene and propylene are very difficult to separate from the other gases such as propane and ethane with which they are normally associated. In addition, the large amounts of contaminant gases such as methane and hydrogen usually found in refinery off-gas necessitates the use of large and expensive equipment for the separation of the ethylene. In the past, methods for separating the ethylene from such contaminants have unavoidably incurred the loss of substantial amounts of valuable components. Furthermore, the variation in concentration of the components in the various hydrocarbon fractions has made it extremely expensive to construct a single system which would be of general application to the recovery of the olefinic hydrocarbons from the various feeds. Therefore, if the relatively pure olefins are to find an expanding market, it is necessary to provide for substantial economies of utilities in the separation of the valuable olefins from the gases with which they are normally associated.

The principal object of my present invention is to further increase the economies in recovering ethylene and propylene from gaseous mixtures which also contain ethane and methane.

More specifically it is the particular object of my present invention to utilize a unique refrigeration cycle by which the efficiency of separation can be greatly increased with a simplified control system and with an accomplishment of high yields of products.

Further objects and advantages of my invention will appear from the following description thereof taken in connection with the attached drawing in which the figure is a schematic flow diagram of the end units for the recovery of the ethylene, ethane, propylene and propane components and the accompanying refrigeration circuit.

2

In a commercial ethylene recovery plant, of which the following relates only to a part, the ethylene-bearing gas stream introduced to the recovery system contains various proportions of hydrogen, hydrocarbons containing from 1 to 4 carbon atoms, and certain impurities including carbon dioxide and nitrogen.

In my above application for patent I have disclosed a system for the continuous recovery of ethylene and the return of paraffinic hydrocarbons to a cracking unit to produce further olefins whereby I obtain very high yields of ethylene.

My present invention relates only to that proportion of the original feed stream which contains ethane, ethylene, propane, and propylene which are all the $C_2$ and $C_3$ hydrocarbons, the remaining materials having been eliminated by absorption, fractional distillation, etc.

In accordance with my invention, the feed stream 11 containing only the $C_2$ and $C_3$ hydrocarbons is passed through the cooler 12 into the de-ethanizer 10 which is preferably a typical bubble deck fractionating column. The gaseous overhead 13 is condensed in the refrigerated condenser 14 with the condensate accumulated at 15, a part being returned as reflux through line 16 and the balance being removed through line 17. This tower 10 is so operated that the overhead in line 17 contains only ethane and ethylene.

This $C_2$ fraction is then passed to the ethylene tower 18 which is also conveniently of the bubble deck type. The overhead removed at 19 is passed through the refrigerant cooled condenser 20 with the liquid accumulated at 21. The tower is refluxed with the condensate through line 22 and the ethylene is removed at 23'. A reboiler circuit including reboiler 23 is used at the bottom and ethane is removed at 24.

The de-ethanizer tower 10 is also provided with a reboiling circuit through the heat exchanger 25. The bottoms in line 26 contains only the $C_3$ hydrocarbons. This bottoms is passed through a cooler 68 and is then introduced to the propylene tower 27, which is provided with a reboiler circuit through heat exchanger 28. The bottoms removed at 29 is propane of the desired purity. The overhead removed at 30 is largely propylene.

Due to the temperatures and pressures of operation necessary to separate these gaseous mediums, one from the other, a substantial refrigeration load is required. I find that the propylene removed at 30 is particularly useful in this respect, for by the necessary compression and expansion I can obtain, not only the necessary refrigeration, but also the desired column reboiling.

I am of course aware of the suggestion heretofore made that fractionation of close boiling compounds can be accomplished by the use of an interconnected heat pump thermal cycle applied to the reboiler and overhead condenser of a fractional distillation system such as shown in my recent Patent Number 2,534,274. Generally, however these have limitations of control that make them unacceptable to a cycle of operations as described herein. As will be described hereinafter, I find that the refrigeration cycle of the heat pump type can be used most effectively when the $C_3$ components are first removed from the $C_2$ components and then the unsaturated fractions are separated from the saturated fractions.

The process of separating the individual components of the $C_2$, $C_3$ feed by this operation is particularly beneficial in that the final separations are made between the closest boiling materials. The $C_2$ fractions, ethylene having a boiling point of $-157°$ F., and ethane having a boiling point of $-127°$ F. thus have a temperature variation of only 30° F. Similarly propylene boiling at $-54°$ F. has a boiling point only 5° F. from that of propane which boils at $-49°$ F.

Referring now to the propylene overhead from line 30, I pass this as a gas through line 31 to the first stage 32 of the multi-stage compressor 35. While some of the effluent then continues through the second and third stages 33 and 34 as hereinafter described, the low pressure effluent in part is removed through line 66 and thence line 50 through the reboiler 28 of the propylene tower 27. The heat removed is sufficient to reboil this tower and the condensed effluent then passes through line 50' to the first stage accumulator drum 51.

From the first stage accumulator drum 51, a liquid portion of the propylene may be pumped by pump 59 through line 60 and line 61 to the top of tower 27 as reflux. It will thus be seen that the complete heat requirements for tower 27 are served by work done on the overhead product not only to reboil the bottoms but to reflux the tower. The system is not limited by the existence of balanced requirements of heat removed as compared to heat input as will be seen from the following tie-in part of the system.

Generally, I prefer to provide so much liquid propylene in the first stage accumulator 51 that there is available refrigerant for refluxing towers 10 and 18 as well. Part of the liquid in line 60 is thus passed through line 64 and thence through condenser 20 for indirect condensation of the overhead. The vaporized liquid also returns to the first stage compressor. Similarly a part of the liquid propylene in line 60 passes through line 65 and thence through overhead condenser 14 with the vaporized propylene returned through lines 63 and 62 back to the first stage compressor. It will thus appear that I utilize the overhead of the propylene tower not only to reboil the propylene tower but also to reflux all three towers.

A portion of the effluent from the second stage of the compressor is withdrawn through lines 67 and 45 and used to reboil the ethylene tower 18 through its reboiler 23; the condensed liquid is returned through line 45' to the second stage accumulator 48. The liquid portion may be expanded through valve 52 in line 53 and returned to the first stage accumulator.

The effluent from the third stage of the compressor is passed through line 39 and is at such a pressure that it can then be condensed with water in heat exchanger 38 and such material expanded through valve 42 is fed into the third stage accumulator 43. The gaseous portion is returned through line 44 to the third stage of the compressor and the liquid may be drawn off through line 46, expanded through valve 47 and introduced to the second stage accumulator 48.

Further refrigerant can be removed from the second stage accumulator 48 through line 55 and be used to cool heat exchanger 12 and for other purposes not herein important, with the vaporized material returned in line 58 to the gas line 49. The final propylene end product is removed through line 40 and may be condensed by water cooled exchanger 41.

In a particular embodiment of my invention, the charge to line 11 had the following approximate composition:

210.0 mols. ethylene
48.9 mols. ethane
110.3 mols. propylene
213.5 mols. propane This was cooled to about 60° F. in heat exchanger 12 and column 10 was operated at 400 p. s. i. g. Tower 18 was operated at 380 p. s. i. g. to have a suitable pressure difference for the direct transfer of overhead product. Tower 27 need only be operated at approximately 20 p. s. i. g. for the desired separation.

The temperature of the overhead of the respective towers varied also by about 15° F. for best operation of the refrigerant cycle, tower 10 having the highest temperature.

It will thus appear that the process of first separating the individual components of the $C_2$, $C_3$ feed into $C_2$ components and $C_3$ components followed by the separation of olefin fractions from paraffin fractions is particularly beneficial in view of the fact that the final separations made are between the closest boiling materials and thus with the least work requirements. The specific pressures and temperatures of these components thus make for a highly efficient separation with the minimum of work on the compressor and with the lowest requirement of cooling water. Nevertheless, the controls are such that great precision can be obtained for any variation in feed stock. There is also the substantial advantage of using the propylene as the refrigerant due to the opportunity of ultimately cooling it effectively with cooling water in the usual available range of 60° F. to 100° F. It can also be used as direct reflux to the propylene tower thus saving on overhead condenser equipment that would otherwise be necessary for this tower.

It will be apparent that I have disclosed a preferred form of embodiment of my invention and that modifications may be made that are within the scope and spirit of the disclosure herein and of the claims appended hereinafter.

I claim:

1. The method of recovering the separate components of a hydrocarbon gas mixture containing ethane, ethylene, propane and propylene which comprises fractionally distilling the ethylene and ethane as overhead from said propane and propylene as bottoms in a deethanizer tower, fractionally distilling the ethylene from the ethane in an ethylene tower, fractionally distilling a gaseous propylene overhead from a propane bottoms in a propylene tower, compressing the propylene overhead, reboiling said propylene tower with a first part of the compressed propylene, reboiling said ethylene tower with a second part of the compressed propylene, condensing a part of the compressed propylene, expanding a portion of said condensed propylene, indirectly condensing said deethanizer tower overhead and said ethylene tower overhead with said expanded portion of propylene directly introducing a further portion of propylene condensate, into said propylene tower as reflux, withdrawing a portion of propylene as net propylene product and removing the ethylene product as the overhead from the ethylene tower.

2. The method of recovering the separate components of a hydrocarbon gas mixture as claimed in claim 1 wherein the overhead temperature of the propylene tower is at least 15° F. lower than the overhead temperature of the deethanizer tower.

3. The method of recovering the separate components of a hydrocarbon gas mixture as claimed in claim 1 wherein the overhead temperature of the propylene tower is at least 15° F. lower than the lesser of the overhead temperatures of the deethanizer and the ethylene towers.

4. The method of recovering components as claimed in claim 1 in which the propylene overhead is compressed in three stages and the effluent of the second stage is first used to reboil the ethylene fractionator and then used as refrigerant for the feed to the deethanizer.

5. The method of recovering the separate components of a hydrocarbon gas mixture as claimed in claim 1 wherein the overhead from said deethanizer tower is condensed and directly passed to said ethylene tower, and the bottoms from said deethanizer are directly passed to said propylene tower.

6. The method of recovering the separate components of a hydrocarbon gas mixture from which hydrogen, methane, and components higher boiling than $C_3$ have been removed in a prior step, said mixture containing preponderant amounts of ethane, ethylene, propane, and propylene, which comprises separating the ethylene and ethane as overhead from a propane and propylene bottoms in a super-atmospheric deethanizer tower, separating the ethylene from the ethane in an ethylene tower, said ethylene tower having a slightly lower operating pressure than said deethanizer tower, separating a propylene overhead from a propane bottoms in a propylene tower operating at a substantially lower pressure than said deethanizer tower, compressing the propylene overhead in a plurality of stages, removing part of the compressed propylene from earlier and later stages of compression for reboiling the propylene tower and the ethylene tower respectively, indirectly condensing the propylene effluent from said compression with water, expanding a portion of said propylene condensate to indirectly condense the deethanizer tower overhead and the ethylene tower overhead, directly introducing a further portion of the liquid propylene into the propylene tower as reflux, and removing the ethylene as the overhead from the ethylene tower.

7. The method of recovering the separate components of a hydrocarbon gas mixture from which hydrogen, methane, and components higher boiling than $C_3$ have been removed in prior steps, said mixture containing preponderant amounts of ethane, ethylene, propane, and propylene, which comprises separating the ethylene and ethane as overhead from a propane and propylene bottom in a deethanizer tower at about 400 p. s. i. g., separating the ethane from the ethylene in an ethylene tower at about 380 p. s. i. g., separating a gaseous propylene overhead from a propane bottoms in a propylene tower at about 20 p. s. i. g., compressing said propylene overhead in a three stage compression operation, removing a first portion of the compressed propylene from said first stage of compression, reboiling said propylene tower with said first portion, removing a second portion of the compressed propylene from said second stage of compression, reboiling said ethylene tower with said second portion, condensing the net effluent from said compression operation with normally available cooling water, expanding a portion of said propylene condensate to indirectly condense the deethanizer tower overhead and the ethylene tower overhead, directly introducing a further portion of the liquid propylene into the propylene tower as reflux, and removing the ethylene as overhead from the ethylene tower.

8. The method of recovering the separate components of a hydrocarbon gas mixture as claimed in claim 6 wherein the propylene condensate is vaporized in condensing the deethanizer tower overhead and the ethylene tower overhead and the thus vaporized propylene is combined with the overhead from the propylene tower and passed to said compression operation.

LUDWIG KNIEL.

References Cited in the file of this patent

UNITED STATES PATENTS

| Number | Name | Date |
|---|---|---|
| 2,127,004 | Nelson | Aug. 16, 1938 |
| 2,355,589 | Brandt | Aug. 8, 1944 |
| 2,409,459 | Van Nuys | Oct. 15, 1946 |
| 2,482,304 | Van Nuys | Sept. 20, 1949 |
| 2,500,353 | Gantt | Mar. 14, 1950 |
| 2,564,200 | Grekel | Aug. 14, 1951 |